Aug. 18, 1931.  C. EISLER  1,819,597
COMBINED MACHINE FOR EXHAUSTING, BOMBARDING, AND SEALING
OFF RADIOTUBES, LAMP BULBS, AND THE LIKE
Filed April 25, 1925   3 Sheets-Sheet 1
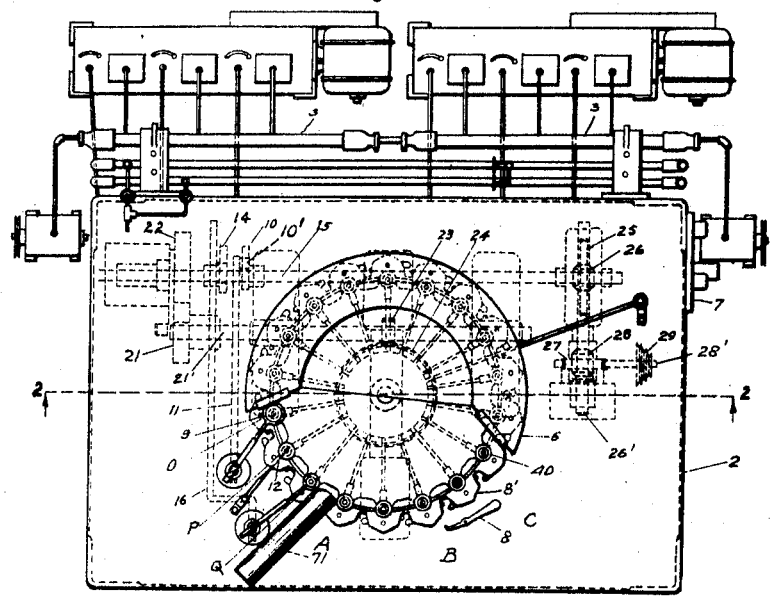

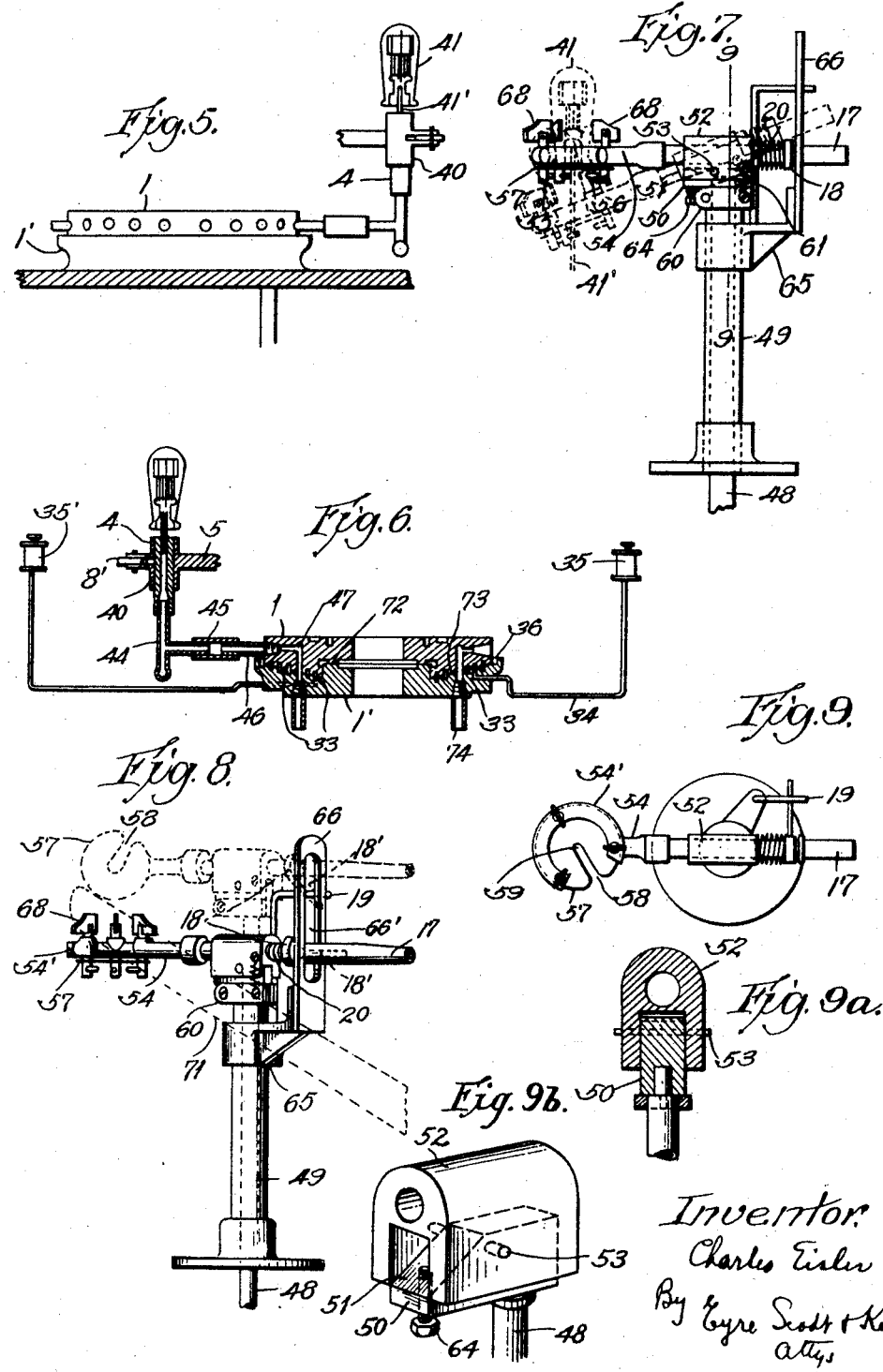

Aug. 18, 1931. C. EISLER 1,819,597
COMBINED MACHINE FOR EXHAUSTING, BOMBARDING, AND SEALING
OFF RADIOTUBES, LAMP BULBS, AND THE LIKE
Filed April 25, 1925 3 Sheets-Sheet 3

INVENTOR
Charles Eisler
BY Richard Eyre
ATTORNEY

Patented Aug. 18, 1931

1,819,597

UNITED STATES PATENT OFFICE

CHARLES EISLER, OF NEWARK, NEW JERSEY, ASSIGNOR TO EISLER ELECTRIC CORPORATION, A CORPORATION OF DELAWARE

COMBINED MACHINE FOR EXHAUSTING, BOMBARDING, AND SEALING OFF RADIOTUBES, LAMP BULBS, AND THE LIKE

Application filed April 25, 1925. Serial No. 25,745.

This invention relates to a machine for exhausting bombarding and sealing off radio tubes, lamp bulbs and the like.

One object of the invention is a machine for exhausting and sealing off radio tubes, lamp bulbs and the like whereby the exhausting and sealing off operations are automatically effected with a minimum of manipulation and in a manner contributing to the exhaustion and sealing off of such devices on a quantity production basis and with a minimum breakage and discard. A further object is a combined exhausting, bombarding (silvering or opaquing) and sealing off machine whereby these operations are entirely automatically effected. A still further object of the invention is an exhaust machine embodying a novel and improved sealing off or tripping mechanism whereby at the desired station of the machine the fusing of the exhaust tube and the separation thereof from the lamp is effected in a peculiarly advantageous manner. A still further object is a sealing off and tripping mechanism including a mechanism for automatically dumping the finished lamp from the machine into a chute or receptacle after the sealing off operation is completed. A further object of the invention is a novel and improved valve and valve mechanism for effecting the desired exhaust connections with the tube or lamp bulbs as they advance from one position to another. A still further object is a novel and improved system of exhaust connections including a plurality of pumps whereby the exhaustion of the tubes or bulbs is progressively and automatically effected in a peculiarly effective manner. A still further object of the invention is a novel and improved arrangement for detecting and isolating defective tubes or lamps during the exhaustion.

For a better understanding of the above indicated novel features of my invention, and others which will hereinafter appear, reference may be had to the accompanying drawings forming a part of the application, wherein:

Fig. 1 is a plan view of the machine,

Fig. 2 is a sectional view on the line 2—2 of Fig. 1,

Figure 11:
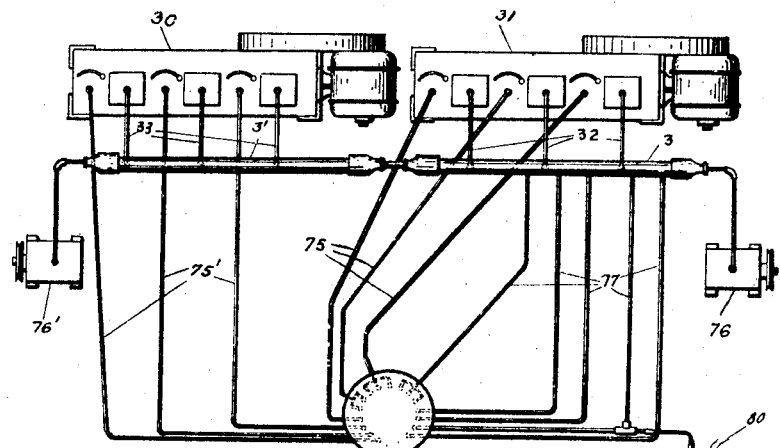
Figure 3:
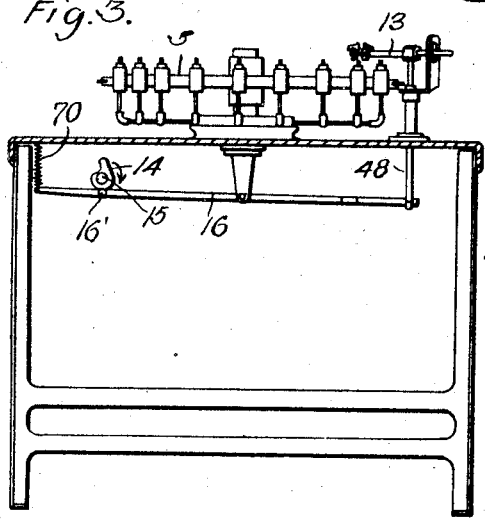
Fig. 3 is a partly sectional and partly elevational view of the machine.
Figure 4:
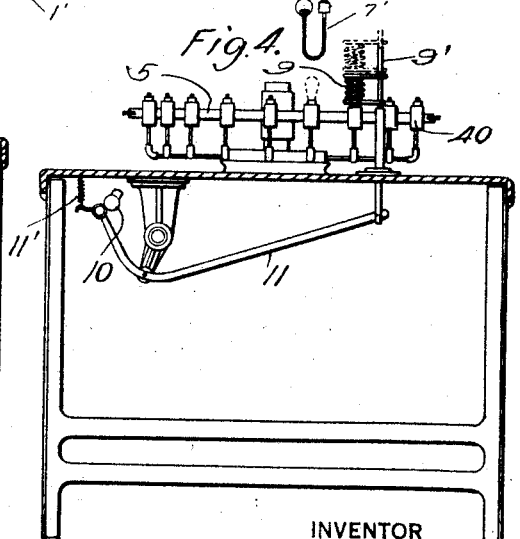

Fig. 4 another view similar to Fig. 3, showing the bombarding mechanism of the combined machine, Fig. 5 is a side view of the exhaust control valve, Fig. 6 is a sectional view thereof, Fig. 7 is a side view of the sealing off or tipping torch mechanism, Fig. 8 is a perspective view thereof, Fig. 9 is a plan view thereof, Fig. 9a is a sectional view along the line 9—9 of Fig. 7, Fig. 9b is a perspective view of a machine part, Fig. 10 is a view of a mechanism for disconnecting a defective lamp, and Fig. 11 is a diagrammatic or schematic view of the exhaust connections, including the valve and pumps.

Referring first to Figs. 1, 2 and 3, my improved machine includes a stationary table 2 which is mounted on suitable standards for support at the desired height. This table 2 carries rotatably mounted thereon a spider or frame 5, this frame 5 having a vertical shaft 5' which is suitably journaled in bearings carried by the table 2 for rotation thereabout. The frame or spider 5 carries a plurality of exhaust heads 40 for the reception of the tubes or lamp bulbs 41 which are to be exhausted, silvered and sealed off. Each of these exhaust heads 40 includes a rubber sleeve 4 (Figs. 5 and 6) passing through and firmly held within the openings in the spider arms 5. These heads are adapted to receive the exhaust tubes or tubulatures 41' of the lamps 41. The rotary frame or spider 5 progressively advances these tubes or lamps 41 to effect the different exhaust connections and to perform the several operations characteristic of this machine. At 6 is indicated an annular heating oven which is carried by standards on the table 2 just above the exhaust heads 40 and during the exhaust operations the lamp bulbs 41 are transported through this annular heater or oven 6.

A slot or opening 42 is provided in the bottom of the oven to accommodate the exhaust tubes or tubulatures 41' of the lamp bulbs extending down to the heads 40. The oven 6 may be heated in any desirable manner, as for example by means of the gas burners 43. In the particular embodiment illustrated there are indicated eighteen exhaust heads 40 which correspond to the eighteen stationary positions of the rotary frame or spider 5. The latter during the operation of the machine is intermittently and successively moved from one position to the next. This intermittent movement is effected by the spiral gears 23 and 24 respectively, carried by the shaft 21' and the shaft 5', the Geneva wheel 21 carried by the shaft 21', the driver 22 carried by the continuously rotating shaft 15. The latter may be driven in any suitable manner, as for example by a worm gear 25 on shaft 15, worm 26 on shaft 26', worm gear 27 on shaft 26', worm 28 on the shaft 28' and a driving pulley 29, the latter being driven by an electric motor 29'.

Each of the exhaust heads 40 is connected with the upper part 1 of a valve 1, 1' (Figs. 5 and 6) through the medium of the T or L connections 44 having one end connected to the rubber sleeve 4 and the other end leading through a coupling 45 and then through a pipe connection 46 leading to a channel 47 in the valve part 1. As the frame or spider 5 is progressively rotated from one position to another, it is understood that each tube or lamp is successively connected with the exhaust connections, these connections and the valve mechanism being more particularly described below.

The two front positions A (Fig. 1) are for the removal of the sealed off exhaust tube and the loading of new lamps in position.

With a tube or lamp inserted on the exhaust head 40 in one of the positions A, it is carried by the frame 5 to the first exhaust position B and then to position C. Here the lamp is sufficiently exhausted to enable the detection of a leak or defect in the lamp. This detection is made by a leak detector 7' (Fig. 11) mounted on the instrument board 7 (Figs. 1 and 2) which is carried by the stationary table 2. If the tube or lamp shows a defect, as indicated by a signal from the leak detector, the operator disconnects or isolates the defective lamp from all communication with the exhaust connections by operating a pinch-cock 8' (Fig. 10) which engages the rubber sleeve 4 below the exhaust tube of the lamp and isolates the lamp from any further connection with the valve during its movement about the machine. In Fig. 10 I have indicated a lever mechanism 8 for actuating the pinch-cock, there being a pinch-cock and operating mechanism for each exhaust head 40. The pinch-cock includes a clamping member 90 which engages the rubber sleeve 4 and a cam member 91 pivoted at 92 and having a cam heel which engages the squeezing clamp 90. If no leak or defect is shown, the lamp is progressively carried around by the rotating frame 5 to position O, disposed at the outlet of the annular heater 6. In this position, and while the frame 5 is stationary, the tube or bulb is subjected to an opaquing or silvering operation, known in the art as "bombarding", which is the name used for heating the bulb or tube and exploding the magnesium getter which gives the tubes a silvery appearance. The internal heating is effected by high frequency currents which are applied by a high frequency coil 9 (Fig. 4). The latter in the particular embodiment herein shown is mounted on a vertically slidable rod 9' mounted within a tubular support carried by the table 2. At the proper time, namely when the lamp comes to rest at the position O, this coil 9 is brought down over the tube or bulb and while there the high frequency heating currents are automatically applied to effect this operation. The relative movement of the bombarding coil 9 with reference to the tube or lamp bulb is effected by a lever 11 which is pivotally mounted upon the lower side of the table 2 and has one end connected to the lower end of the sliding rod 9' and its other end operatively associated with a continuously revolving cam 10. This cam engages a roller 10' on the end of the lever and being driven in the proper time relation, as for example by the shaft 15, it causes in cooperation with a spring 11' the lowering of the coil 9 about each of the lamp bulbs as they come to rest at the position O and to again lift the coil to clear each lamp before the intermittent movement to the next position P takes place. At the next position P (see Fig. 1) the vacuum test is automatically applied, which consists of touching the tube or bulb by a flexible metallic strip 12 connected to the secondary winding of a high frequency coil 12' (Fig. 2). This strip 12 may be supported in any suitable manner, so as to wipe past the tubes as they go past.

At the next position Q the tube or bulb is automatically sealed off and removed from the machine. The tipping torch mechanism which is indicated generally by the numeral 13 (Fig. 3) will now be described. Referring to Figs. 7, 8, 9 and 9ª, the whole tipping torch mechanism is mounted on a vertically slidable rod 48 within a stationary tube 49 carried by the table 2 in a position juxtaposed to the station Q. The rod 48 carries at its upper end a block or head 50 having a bevel 51 on the upper edge thereof and pivotally mounted on this block 50 is a U-shaped member 52, this member 52 (Fig. 9ª) being pivoted by means of the pivot pin 53 which passes through the block 50. The part 52 carries on one side thereof the frame member 54, a gas or fuel pipe 17 passing through the upper part of the U member 52 approximately at right angles to the rod 48 and being threadedly attached to the torch frame 54. The latter terminates in an arcuate manifold portion 54' and both the parts 54 and 54' are employed to convey and distribute the fuel gas coming in through the pipe 17. The lower part of 54' carries the burners 55, in the particular embodiment shown there being three of these burners with their tips 56 horizontally disposed and directed to a point within the axial center line of the arcuate member 54'. The burners 55 communicate with the hollow torch frame 54, 54'. The part 54' carries on the under side thereof a plate 57, this plate 57 being disposed just above the burner tips 56 and serving to shield the lamp bulb bodies from the flames. The plate 57 is provided with a slot 58 for the reception and accommodation of the exhaust tubes 41' of the tubes or lamp bulbs 41. Around the upper end of the rod 48 and disposed between the head 50 and the upper end of the stationary tube 49 there is carried a collar 60 and to this collar there is attached a coil spring 61, the upper end of the spring being attached to the rockable U-shaped member 52, this spring tending to hold the member 52 and the frame 54 in the horizontal or full line position indicated in Fig. 7, but this frame, together with the member 52 may be tilted about the pivot pin 53 against the tension of the spring 61 as shown to a somewhat exaggerated degree in the dotted position in Fig. 7. An adjustable screw bolt 64 passes upwardly through the head 50 and through the beveled portion 51 (which permits the rocking of the frame) and limits the rocking movement thereof. The stationary tube 49 also carries near its upper end a bracket 65 which in turn carries a standard 66, the latter having an elongated vertical slot therein for the accommodation of the gas pipe 17 leading to the torch frame 53. The torch frame 54, 54' including the gas pipe 17 is oscillatable about the axis of the pipe 17 within the U-shaped member 52 and a torsion spring 20, surrounding the gas pipe 17 and having one end attached to the member 52 and the other end attached to a collar 18 secured to the gas pipe 17, normally maintains the arcuate burner frame 54' in a horizontal position. The collar 18, however, has a finger 18' extending therefrom normally in the horizontal position, and when the torch frame as a whole is elevated by the carrying rod 48 this finger is adapted to engage an arm 19 which is also carried by the bracket 65 and oscillates the frame 54, 54' about the axis of the frame member or pipe 17 and against the tension of the torsion spring 20, this arm 19 extending upwardly and having at its upper end a horizontal portion disposed in the path of the finger 18' extending from the collar 18. The part 54' carries on its upper side the adjustable bulb or tube grippers 68, there being three of these shown in the particular modification and they being arranged so that a bulb may freely enter between the said grippers with its exhaust tube 41' extending downwardly through the slot 58 of the shield 57. The operation of the sealing or tipping off mechanism above described is as follows: The torch frame 54, 54' is normally at its lowermost position resting upon the upper end of the stationary tube carrier 49 with the part 54' just above the level of the exhaust heads 40, so as to freely clear them, and is disposed at position Q of the machine so that when the exhaust head with a lamp bulb carried thereby comes to rest at this position, the exhaust tube occupies the position 59 disposed at the center of the arcuate burner conduit or manifold 54', the slot 58 being in a line with the movement of the exhaust tube 41' and permitting it to enter freely therein. As each of the exhaust heads with the lamp or tube carried thereby, one by one reaches the position Q and comes to rest there, the rod 48 together with member 52 and the torch frame 54, 54' are elevated to cause the grippers 68 to engage the sides of the lamp bulb, in the particular instance illustrated herein the sides of the bulb neck, with the plate 57 engaging the bottom of the bulb neck and the exhaust tube 41' passing downwardly through the slot 58 thereof. The flames from the burner tips 56 converge upon the exhaust tube at a point immediately below the plate 57 for melting and fusing the same. At the initial engagement of the frame 54' with the lamp bulb the frame is tilted about the pivot pin 53 against the tension of the spring 61, in order to minimize the shock of the engagement with the lamp bulb. The automatic elevation of the torch frame in position Q is effected by means of a lever 16 pivotally mounted on a bracket carried by the under side of the table, this lever 16 having one end in pivotal engagement with the lower end of the rod 48 and having its other end in operative engagement with the continuously rotating cam 14 fixed to the shaft 15. This cam member (see Fig. 3) is so shaped as to have two cam portions, an intermediate portion of circular contour and a reverse cam portion. The shaft 15 is constantly rotated and the cam 14 engages the roller 16' on the lever 16, so that when either of the two cam portions at opposite sides of the true circular portion of the cam moves over the roller it moves the lever 16 against the tension of spring 70 which is attached at one end of the lever 16 and at the other to the fixed part of the table. The spring 70 tends to maintain the torch frame in its lowermost position. The first cam portion of the cam 16, in proper time relation, elevates the torch frame to a position to tilt the torch member against the tension of the spring 61 with the grippers 68 and the plate 57 in yielding engagement with the bulb. At this time the burner tips 55 direct concentrated flames upon the exhaust tube 41′, thereby fusing and effecting the seal of the same. During this period the circular portion of the cam 16 is passing over the roller 16′ and the torch frame as a whole is maintained stationary until as the exhaust tube becomes fused the tension of spring 61 stretches the fused glass at the seal. According to the adjustment of the machine, or other conditions, the fused glass may be separated completely by the force exerted by the spring 61, or the final separation may be effected by the further movement of the torch frame caused by the second cam portion of the cam 14 when it reaches the roller 16′. Further movement of the torch frame in response to the movement of this second cam portion of the cam 14 results in the engagement of the finger 18′ of the collar 18 with the stop 19, which causes a turning of the torch frame about the axis of the gas pipe 17 to dump the completed lamp which is now resting lightly upon the grippers 68 into a chute indicated generally at 71. From here the completed lamp slides down by gravity into a suitable receptacle, not shown for convenience in illustration. After the tilting of the frame in this manner and the dumping of the lamp, the cam 14 by its continuous movement finally permits the spring 70 to withdraw the torch frame to its full line position indicated in Fig. 7 where it is ready to receive the bulb on the next succeeding exhaust head at the next succeeding intermittent movement. At this movement the fused off exhaust tube 41′ is carried to position A where it may be removed by the operator and a new lamp inserted and supported therein only by the exhaust tube 41′.

The control valve for successively connecting the lamps or tubes with the exhaust lines consists of the lower stationary member 1′ (Figs. 2, 5 and 6) carried by the table 2 and an upper cooperating member 1 which rests thereupon and is keyed to the shaft of the revolving spider 5 for movement in time relation therewith. The lower member 1′ is in the form of a circular plate having on its upper side an annular recess around the central hub portion 72 thereof, this annular recess being of substantial depth in the vicinity of the central hub portion 72 but having its bottom surface upwardly inclined towards the peripheral edge of the member to provide a gradually decreasing depth radially outward. The upper member 1, which rests upon the member 1′, is provided with a central recess portion corresponding to the hub portion 72 and its under surface is bevelled off to accurately fit the inclined bottom surface of the annular recess of the lower member. The inclined engaging surfaces are indicated at 73. The lower member 1′ is provided with pipe connections 74 connecting with vertical channels or ports which are adapted to register successively with the channels 47 of the upper member 1 as the latter is intermittently moved from one position to another. The members 1, 1′ at their mating surfaces are provided with registering annular grooves 33, there being three of such grooves on each member disposed outwardly of the registering exhaust connections and two such grooves on each member disposed inwardly thereof, adjacent the hub portion 72. Similarly, there is an annular groove formed in the upper member 1 adjacent the upper peripheral edge of the hub portion 72 and these various grooves are maintained full of a fluid such as a suitable oil, these grooves being maintained full of oil by a reservoir 35 having a pipe connection 34 leading to the center of the three grooves 33 disposed outwardly of the registering parts, the oil flowing by gravity into the grooves. The lower member 1′ also is provided with an annular rim 36 about its peripheral edge which rim slightly overlaps the upper member 1 and is adapted to also contain a sealing fluid such as oil. The particular construction of this valve, including the recessed lower member with the cooperating parts of the upper member together with the particular method of sealing reduces the leakage through the valve to a minimum and contributes to the effective exhausts of the lamp bulbs and tubes.

I have illustrated in Fig. 11 one embodiment of my improved exhaust system, including a lower member 1′ of the connecting valve. According to this embodiment there is a preliminary exhaust manifold 3 which is connected with a rough exhaust pump 76 and there are five pipe connections 77 leading from this preliminary exhaust manifold 3 to corresponding ports of the valve member 1′. This embodiment also includes a triple high vacuum pump 31 driven in any suitable manner, as for example by the electric motor shown, and each of these pumps has its intake connected through a pipe 75 with a suitable corresponding port or ports of the valve member 1′, while the exhaust of each of these pumps is connected with the preliminary exhaust manifold 3. There is also a second triple high vacuum pump 30 each cylinder of which has its intake leading through a pipe 75′ to a corresponding port of the valve member 1′ and each of the exhausts of this second triple pump leads through the pipes 33 to a manifold 3′ and to this manifold there is connected an exhaust pump 76′, preferably of a higher degree vacuum than the pump 76. Preferably the high vacuum pumps 31 have different degrees of vacuum with ascending higher vacuums from the right toward the left, and preferably the vacuums created by the pumps 30 increase in value from the right toward the left, as for example by running the pump elements at increasing speeds from the right toward the left. In the particular embodiment illustrated there are seven exhaust positions in which the lamp bulb in its travel is connected through the pipe 77 with the preliminary exhaust manifold 3. The first of the high vacuum pumps 31 leads to three positions or ports, the second to two positions, and the third to a single position. Each of the pumps 30 leads through the pipe 75' to a single port. A tube or bulb, therefore, while being exhausted, experiences a rough evacuation on the first seven positions connected with the manifold 3 and is then progressively connected with the high vacuum pumps 31 with their different degrees of evacuating power for still further perfecting the vacuum. Finally the bulb is connected successively with the three positions or ports leading to the high vacuum pump 30, which together with the separate exhaust manifold 3' which is connected with the intake of the exhaust pump 76', serve to effect a vacuum of the desired degree in tube and lamp bulb operations. Moreover, the exhaust plant is of a self-contained unit, rendering it unnecessary to utilize any other exhaust source or means than that contained in the unit.

I claim:

1. In a sealing off machine a burner frame in the form of an arcuate gaseous fuel manifold having burner tips on the under side thereof and bulb grippers on the upper side thereof with a slotted shield plate disposed between the burner tips and the bulb grippers.

2. In a combined tube or lamp making machine the combination of a relatively movable exhaust head adapted to successively assume definite positions, a movable high frequency heating coil disposed at one of said positions in juxtaposition to an exhaust head and the lamp bulb carried thereby, said high frequency coil being adapted to move into heating relation with a bulb supported by the head to cause the exploding of the getter within the bulb and the consequent silvering of the bulb, a sealing off mechanism at a later position assumed by said exhaust head and means functioning in time relation to said intermittently movable exhaust head to first actuate the high frequency heating coil into operative position with respect to a lamp bulb carried by the head and then to seal off the bulb at the later position.

3. In an exhaust machine for tubes or lamp bulbs, a rotary frame carrying a plurality of exhaust heads, a plurality of exhaust connections and a valve mechanism between said exhaust heads and said exhaust connections, including a stationary valve member having an annular recess in its upper side, said recess being of gradually increasing depth from its outer to its inner periphery, a relatively movable valve member operated in time relation with the rotary frame and having an inclined annular cooperating portion on its under side disposed within the annular recess of the stationary member and mating therewith, each of said valve members having channels or ports which are adapted to register with one another at the different relative positions thereof, and a plurality of oil seals disposed on opposite sides of the channel or valve connections for the purpose set forth.

4. An exhaust machine of the character set forth in claim 3 wherein an oil reservoir disposed above the level of the valve members functions to supply oil to the oil seals through a connecting pipe.

5. A valve mechanism for exhaust machines for tubes and bulbs comprising a circular lower member having a central hub like portion and an annular recess on the upper side thereof of gradually decreasing depth from the hub portion towards the periphery thereof, and an upper member having a central recess on its under side to receive the hub portion of the lower member and an inclined annular plate surface around the recess to cooperate with the annular recess of the lower member.

6. In a sealing off machine for tubes and bulbs a reciprocable carrier frame, a torch and tube holder frame including a supporting gas supply pipe pivotally connected to the carrier frame for limited pivotal movements in the plane of reciprocation, said gas supply pipe which carries the torch frame being journaled in the carrier frame for oscillatory movements therein and means for oscillating said gas pipe when approaching the end of its reciprocating movement in one direction.

7. In a sealing off machine for tubes and bulbs a vertically reciprocable head, a frame member pivotally mounted upon said head for limited pivotal movements in the plane of reciprocation, a torch frame and tube holder unit including a gas supply pipe journaled in said pivoted frame for oscillatory movements therein and means for oscillating said gas pipe at the end of the reciprocating movement.

In testimony whereof, I have signed my name to this specification.

CHARLES EISLER.